(12) United States Patent
Handelman

(10) Patent No.: US 9,979,676 B2
(45) Date of Patent: May 22, 2018

(54) METHODS AND APPARATUS FOR ENABLING COMMUNICATION BETWEEN NETWORK ELEMENTS THAT OPERATE AT DIFFERENT BIT RATES

(71) Applicant: III Holdings 2, LLC, Wilmington, DE (US)

(72) Inventor: Doron Handelman, Givatayim (IL)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days. days.

(21) Appl. No.: 15/664,750

(22) Filed: Jul. 31, 2017

(65) Prior Publication Data

US 2018/0019954 A1   Jan. 18, 2018

Related U.S. Application Data

(60) Continuation of application No. 14/086,215, filed on Nov. 21, 2013, now Pat. No. 9,722,952, which is a division of application No. 13/752,306, filed on Jan. 28, 2013, now Pat. No. 8,594,091, which is a continuation of application No. 13/475,795, filed on May 18, 2012, now Pat. No. 8,363,652, which is a
(Continued)

(51) Int. Cl.
*H04L 12/933*  (2013.01)
*H04L 12/861*  (2013.01)
*H04L 12/801*  (2013.01)

(52) U.S. Cl.
CPC .............. *H04L 49/15* (2013.01); *H04L 47/10* (2013.01); *H04L 49/90* (2013.01)

(58) Field of Classification Search
None
See application file for complete search history.

(56) References Cited

U.S. PATENT DOCUMENTS 6,404,522 B1   6/2002   Handelman
6,574,018 B1   6/2003   Handelman
(Continued)

OTHER PUBLICATIONS

Allen et al., "Digital Optical Networks Using Phototonic Integrated Circuits (PICs) Address the Challenges of Reconfigurable Optical Networks," IEEE Communications Magazine, Jan. 2008, pp. 35-43, vol. 46, No. 1, The Institute of Electrical and Electronics Engineers, Inc., USA.
(Continued)

*Primary Examiner* — Mounir Moutaouakil
(74) *Attorney, Agent, or Firm* — Volpe and Koenig, P.C.

(57) ABSTRACT

A method for enabling communication between a network element (NE) operating at a bit rate $R_1$ and a NE operating at a bit rate $R_2$ is disclosed. A ratio of $R_2$ to $R_1$ is represented by a ratio M:N, where M and N are positive integers and M>N. Information is received that is associated with distribution of electrical lanes of at least one of a number of M×K NEs operating at bit rate $R_1$. A distribution of the electrical lanes of the at least one M×K NE based on the received information is determined. The electrical lanes of the at least one M×K NE are interconnected with lane ports of at least one M:N electrical interface of N×K transceivers based on the determined distribution. An indication is transmitted identifying the distribution to the at least one M×K NE.

1 Claim, 7 Drawing Sheets

Related U.S. Application Data division of application No. 13/243,139, filed on Sep. 23, 2011, now Pat. No. 8,223,768, which is a division of application No. 13/095,212, filed on Apr. 27, 2011, now Pat. No. 8,098,661, which is a division of application No. 12/062,655, filed on Apr. 4, 2008, now Pat. No. 7,965,712.

(56) References Cited

U.S. PATENT DOCUMENTS

| | | | |
|---|---|---|---|
| 6,763,191 | B1 | 7/2004 | Handelman |
| 6,983,342 | B2 | 1/2006 | Helenic et al. |
| 7,106,967 | B2 | 9/2006 | Handelman |
| 7,161,964 | B2 | 1/2007 | Lentine et al. |
| 7,162,155 | B2 | 1/2007 | Handelman |
| 7,167,620 | B2 | 1/2007 | Handelman |
| 7,181,139 | B2 | 2/2007 | Handelman et al. |
| 7,317,873 | B2 | 1/2008 | Aoki |
| 7,346,374 | B2 | 3/2008 | Witkowski et al. |
| 7,408,383 | B1 | 8/2008 | Feng et al. |
| 7,634,194 | B2 | 12/2009 | Frankel et al. |
| 7,751,714 | B2 | 7/2010 | Zhong et al. |
| 7,827,589 | B2 | 11/2010 | Briggs |
| 7,898,991 | B2 | 3/2011 | Cole |
| 8,873,963 | B2 | 10/2014 | Handelman |
| 9,130,851 | B2 * | 9/2015 | Ghiasi .................. H04L 49/60 |
| 2002/0034197 | A1 | 3/2002 | Tometta et al. |
| 2003/0039168 | A1 | 2/2003 | Chan et al. |
| 2003/0095783 | A1 | 5/2003 | Binder et al. |
| 2003/0223465 | A1 | 12/2003 | Blanchard |
| 2004/0028086 | A1 | 2/2004 | Ghiasi et al. |
| 2005/0089126 | A1 | 4/2005 | Zerbe et al. |
| 2005/0286643 | A1 | 12/2005 | Ozawa et al. |
| 2006/0159387 | A1 | 7/2006 | Handelman |
| 2007/0047541 | A1 | 3/2007 | Beshai |
| 2008/0205437 | A1 | 8/2008 | Cole |
| 2009/0047025 | A1 | 2/2009 | Hong et al. |
| 2009/0080584 | A1 | 3/2009 | Hamano et al. |
| 2010/0021166 | A1 | 1/2010 | Way |
| 2010/0046436 | A1 | 2/2010 | Doviak et al. |
| 2015/0236810 | A1 * | 8/2015 | Fu .................... H04J 14/0227 398/79 |
| 2015/0256258 | A1 * | 9/2015 | Fu .................... H04B 10/27 398/58 |

OTHER PUBLICATIONS

Barbir et al., "Known Content Network (CN) Request-Routing Mechanisms," Network Working Group, Request for Comments: 3568 (Jul. 2003).

Benner et al., "A Roadmap to 100G Ethernet at the Enterprise Data Center," IEEE Applications & Practice, Nov. 2007, pp. 10-17, vol. 45, Suppl. 3, The Institute of Electrical and Electronics Engineers, Inc., USA.

Cole et al., "100GbE—Optical Lan Technologies," IEEE Applications & Practice, Dec. 2007, pp. 12-19, vol. 45, Suppl. 4, The Institute of Electrical and Electronics Engineers, Inc., USA.

Cvijetic et al., "Delivering on the 100GbE Promise," IEEE Applications & Practice, Dec. 2007, pp. 2-3, vol. 45, Suppl. 4, The Institute of Electrical and Electronics Engineers, Inc., USA.

Ex-Parte Quayle Action, U.S. Appl. No. 13/243,139 dated Feb. 26, 2012.

Frazier, "Aggregation at the Physical Layer," IEEE Communications Magazine, Feb. 2008, p. S12, vol. 46, No. 2, The Institute of Electrical and Electronics Engineers, Inc., USA.

Gustlin, "An Introduction to CTBI," IEEE Communications Magazine, Feb. 2008, p. S13, vol. 46, No. 2, The Institute of Electrical and Electronics Engineers, Inc., USA.

Kang et al., "Link Aggregation Member Interface Status Signal," Internet Draft, draft-zi-pwe3-link-aggr-member-status-00.txt, Oct. 17, 2005, 17 pages, IETF.

McDonough, "Moving Standards to 100 GbE and Beyond," IEEE Applications & Practice, Nov. 2007, pp. 6-9, vol. 45, Suppl. 3, The Institute of Electrical and Electronics Engineers, Inc., USA.

Melle et al., "Bandwidth Virtualization Enables Long-Haul WDM Transport of 40 Gb/s and 100 Gb/s Services," IEEE Communications Magazine, Feb. 2008, p. S22-S29, vol. 46, No. 2, The Institute of Electrical and Electronics Engineers, Inc., USA.

Nicholl et al., "A Physical Coding Sublayer for 100GbE," IEEE Applications & Practice, Dec. 2007, pp. 4-10, vol. 45, Suppl. 4, The Institute of Electrical and Electronics Engineers, Inc., USA.

Non-Final Rejection, U.S. Appl. No. 12/062,655 dated Aug. 5, 2010.

Non-Final Rejection, U.S. Appl. No. 13/752,306 dated Apr. 26, 2013.

Non-Final Rejection, U.S. Appl. No. 14/086,215 dated Aug. 29, 2016.

Notice of Allowance, U.S. Appl. No. 12/062,655 dated Apr. 4, 2011.

Notice of Allowance, U.S. Appl. No. 13/095,212 dated Nov. 28, 2011.

Notice of Allowance, U.S. Appl. No. 13/243,139 dated Mar. 21, 2012.

Notice of Allowance, U.S. Appl. No. 13/475,795 dated Sep. 26, 2012.

Notice of Allowance, U.S. Appl. No. 13/752,306 dated Jul. 24, 2013.

Notice of Allowance, U.S. Appl. No. 14/086,215 dated Mar. 24, 2017.

* cited by examiner

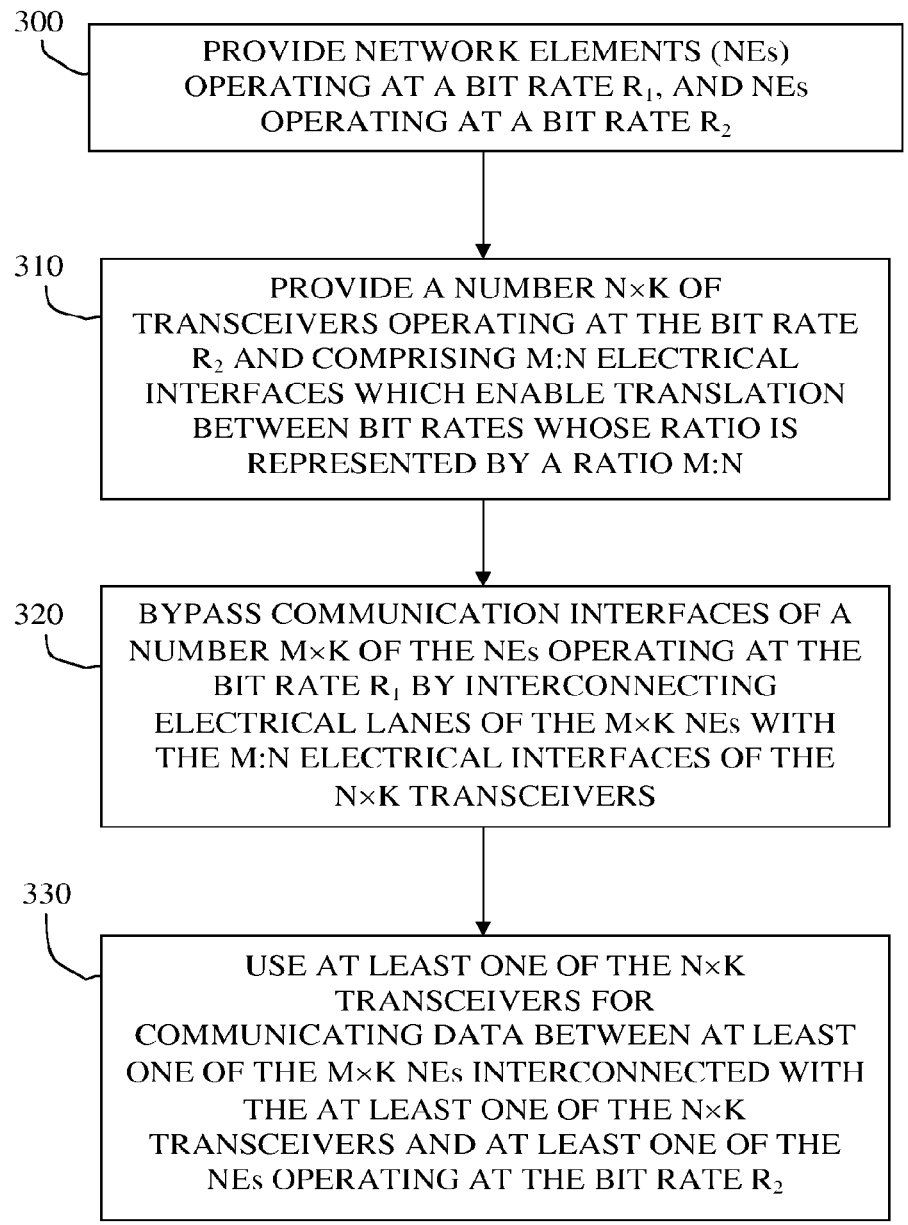

METHODS AND APPARATUS FOR ENABLING COMMUNICATION BETWEEN NETWORK ELEMENTS THAT OPERATE AT DIFFERENT BIT RATES

CROSS REFERENCE TO RELATED APPLICATIONS

This application is a continuation of application Ser. No. 14/086,215, filed Nov. 21, 2013, which is a divisional of application Ser. No. 13/752,306, filed Jan. 28, 2013, now U.S. Pat. No. 8,594,091, which is a continuation of Ser. No. 13/475,795, filed May 18, 2012, now U.S. Pat. No. 8,363,652, which is a divisional of application Ser. No. 13/243,139, filed Sep. 23, 2011, now U.S. Pat. No. 8,223,768, which is a divisional of application Ser. No. 13/095,212, filed Apr. 27, 2011, now U.S. Pat. No. 8,098,661, which is a divisional of application Ser. No. 12/062,655, filed Apr. 4, 2008, now U.S. Pat. No. 7,965,712, each of which is incorporated by reference and from which priority is claimed.

FIELD OF INVENTION

The present invention generally relates to communication networks, and more particularly to Ethernet networks.

BACKGROUND

The increase in communication capacity which is experienced today due to a variety of information technology (IT) services drives efforts to develop technologies that will enable routers and servers to communicate at higher and higher bit rates. As part of these efforts, attempts are being made to define, standardize, and develop technologies for 40 gigabit Ethernet (GbE) and 100 GbE. Some aspects of such attempts are described in the following publications:

an article entitled "Moving Standards to 100 GbE and Beyond", by John McDonough, in *IEEE Applications & Practice*, November 2007, pages 6-9;

an article entitled "A Roadmap to 100G Ethernet at the Enterprise Data Center", by Benner et al, in *IEEE Applications & Practice*, November 2007, pages 10-17;

an article entitled "Delivering on the 100 GbE Promise", by Cvijetic et al, in *IEEE Applications & Practice*, December 2007, pages 2-3; and an article entitled "100 GbE-Optical LAN Technologies", by Cole et al, in *IEEE Applications & Practice*, December 2007, pages 12-19.

SUMMARY

The present invention, in certain embodiments thereof, seeks to improve functionality and interconnectivity of network elements (NEs), such as NEs of an Ethernet network (Ethernet NEs) and NEs of a transport network (transport NEs), particularly in connection with enabling communication between NEs that operate at a first bit rate and NEs that operate at a second bit rate which is different from the first bit rate.

There is thus provided in accordance with an embodiment of the present invention a method for enabling NEs operating at a bit rate $R_1$ to communicate with NEs operating at a bit rate $R_2$, where a ratio of $R_2$ to $R_1$ is represented by a ratio M:N, M and N are positive integers, and M>N, the method including providing a number M×K of the NEs operating at a bit rate $R_1$, each of the M×K NEs including a communication interface communicating at the bit rate $R_1$, where K is a positive integer, providing a number N×K of transceivers operating at the bit rate $R_2$, each of the N×K transceivers including an M:N electrical interface which enables translation between bit rates whose ratio is represented by the ratio M:N, bypassing the communication interfaces of the M×K NEs by interconnecting electrical lanes of the M×K NEs with the M:N electrical interfaces of the N×K transceivers, and using at least one of the N×K transceivers for communicating data between at least one of the M×K NEs interconnected with the at least one of the N×K transceivers and at least one of the NEs operating at the bit rate $R_2$.

At least some of the NEs operating at the bit rate $R_1$ and at least some of the NEs operating at the bit rate $R_2$ may include Ethernet network elements.

The bit rate $R_1$ may be a bit rate of substantially 40 Gb/s (Gb/s—gigabit per second), the bit rate $R_2$ may be a bit rate of substantially 100 Gb/s, and M:N=5:2.

The bypassing may include bypassing the communication interfaces of the M×K NEs in response to at least one of the following: an instruction of a network operator, and a selection by the network operator.

The bypassing may alternatively or additionally include determining a distribution of the electrical lanes of the M×K NEs, and interconnecting each lane of the distribution with a respective lane port of one of the M:N electrical interfaces.

The method may also include transmitting an indication identifying the distribution to at least one of the following: at least one of the M×K NEs, and at least one of the NEs operating at the bit rate $R_2$.

The determining may also include determining the distribution in response to at least one of the following: an instruction of a network operator, and a selection by the network operator.

There is also provided in accordance with an embodiment of the present invention a method of interconnecting Ethernet network elements (ENEs) operating at a bit rate of substantially 40 Gb/s with transceivers operating at a bit rate of substantially 100 Gb/s, the method including providing a number 5×K of the ENEs operating at the bit rate of substantially 40 Gb/s, each of the 5×K ENEs including a communication interface communicating at the bit rate of substantially 40 Gb/s, where K is a positive integer, providing a number 2×K of the transceivers operating at the bit rate of substantially 100 Gb/s, each of the 2×K transceivers having a 5:2 electrical interface operative to convert 10 lanes at substantially 10 Gb/s lane rates into 4 lanes at substantially 25 Gb/s lane rates, and to convert 4 lanes at substantially 25 Gb/s lane rates into 10 lanes at substantially 10 Gb/s lane rates, and bypassing at least one of the communication interfaces by interconnecting at least one electrical lane of at least one of the 5×K ENEs which includes the at least one of the communication interfaces with at least one of the 5:2 electrical interfaces.

Further in accordance with an embodiment of the present invention there is provided a method for enabling a network element (NE) operating at a bit rate $R_1$ which represents an accumulated bit rate of N×J lanes, each operating at a lane bit rate $R_0$ to communicate with an NE operating at a bit rate $R_2$ which represents an accumulated bit rate of M×J lanes, each operating at the lane bit rate $R_0$, where N, M, and J are positive integers, and M>N, the method including providing at least one transceiver which operates at the bit rate $R_2$ and includes M×J lane ports for lanes operating at the lane bit rate $R_0$, interconnecting N×J lanes of the NE operating at the bit rate $R_1$ with N×J of the M×J lane ports of the at least one transceiver, and using the at least one transceiver for communicating data between the NE operating at the bit rate $R_1$ and the NE operating at the bit rate $R_2$.

Still further in accordance with an embodiment of the present invention there is provided an interconnection switch for enabling NEs operating at a bit rate $R_1$ to communicate with NEs operating at a bit rate $R_2$ via transceivers operating at the bit rate $R_2$, where a ratio of $R_2$ to $R_1$ is represented by a ratio M:N, M and N are positive integers, and M>N, the interconnection switch including a controller, and a switching/routing unit operatively controlled by the controller to interconnect electrical lanes of a number M×K of the NEs operating at the bit rate $R_1$ with M:N electrical interfaces of a number N×K of the transceivers operating at the bit rate $R_2$ so as to bypass communication interfaces of the M×K NEs and to enable use of at least one of the N×K transceivers for communicating data between at least one of the M×K NEs interconnected with the at least one of the N×K transceivers and at least one of the NEs operating at the bit rate $R_2$, where K is a positive integer.

The controller may be operative to determine a distribution of the electrical lanes of the M×K NEs, and to control the switching/routing unit for interconnecting each lane of the distribution with a respective lane port of the M:N electrical interfaces.

The interconnection switch may also include a transmitter operative to transmit an indication identifying the distribution to at least one of the following: at least one of the M×K NEs, and at least one of the NEs operating at the bit rate $R_2$.

The interconnection switch may further include an input unit operative to receive an input usable for determining the distribution.

At least some of the NEs operating at the bit rate $R_1$ and at least some of the NEs operating at the bit rate $R_2$ may include Ethernet network elements.

The bit rate $R_1$ may be a bit rate of substantially 40 Gb/s, the bit rate $R_2$ may be a bit rate of substantially 100 Gb/s, and M:N=5:2.

The interconnection switch may be comprised in one of the following: a datacenter; an Ethernet network element, and a transceiver operating at a bit rate of substantially 100 Gb/s.

There is also provided in accordance with an embodiment of the present invention an Ethernet network element (ENE) operating at a bit rate of substantially 40 Gb/s, the ENE including a transceiver including an electrical interface operatively associated with electrical lanes, each operating at a substantially 10 Gb/s lane rate, and a communication interface operative to convert electrical signals provided over the electrical lanes into substantially 40 Gb/s signals, to transmit the substantially 40 Gb/s signals, and to convert received signals at substantially 40 Gb/s into lane-separated electrical signals at substantially 10 Gb/s lane rates, and an element controller operative to control the electrical interface for effecting communication with another ENE operating at the bit rate of substantially 40 Gb/s via the communication interface by interconnecting the electrical lanes with the communication interface, and for effecting communication with an ENE operating at a bit rate of substantially 100 Gb/s by bypassing the communication interface and interconnecting the electrical lanes with at least one 5:2 electrical interface of at least one transceiver which communicates at the bit rate of substantially 100 Gb/s with the ENE operating at the bit rate of substantially 100 Gb/s.

At least one of the electrical lanes includes one of the following lane types: an electrical lane of an intra-rack interconnection, an electrical lane of an inter-rack interconnection, an electrical lane of a high performance computing (HPC) interconnection, an electrical lane of a server interconnection, an electrical lane of a local area network (LAN) interconnection, an electrical lane of a metropolitan area network (MAN) interconnection, an electrical lane of a wide area network (WAN) interconnection, an electrical lane of a storage area network (SAN) interconnection, and an electrical lane of a cluster network interconnection.

Further in accordance with an embodiment of the present invention there is provided a datacenter including at least a number 5×K of ENEs operating at a bit rate of substantially 40 Gb/s, where K is a positive integer, a plurality of optical transceivers operating at a bit rate of substantially 100 Gb/s, each of the plurality of optical transceivers including a 5:2 electrical interface which enables translation between bit rates whose ratio is represented by the ratio 5:2, and an interconnection switch operatively associated with the ENEs operating at the bit rate of substantially 40 Gb/s and with the optical transceivers and including a controller, and a switching/routing unit operatively controlled by the controller to interconnect electrical lanes of a number 5×K of the ENEs operating at the bit rate of substantially 40 Gb/s with 5:2 electrical interfaces of a number 2×K of the optical transceivers so as to bypass communication interfaces of the 5×K ENEs and to enable use of at least one of the 2×K optical transceivers for communicating data between at least one of the 5×K ENEs interconnected with the at least one of the 2×K optical transceivers and at least one ENE operating at a bit rate of substantially 100 Gb/s.

At least one of the ENEs operating at the bit rate of substantially 40 Gb/s includes a server.

At least one of the 5:2 electrical interfaces includes at least one 5:2 serializer/de-serializer (SerDes) integrated circuit (IC).

BRIEF DESCRIPTION OF THE DRAWINGS

The present invention will be understood and appreciated more fully from the following detailed description, taken in conjunction with the drawings in which:

FIG. 3 is a simplified flowchart illustration of a method of enabling communication between NEs operating at different bit rates in any of the network of FIGS. 1A and 1B and the network of FIGS. 2A and 2B;

DETAILED DESCRIPTION

Figure 1A:
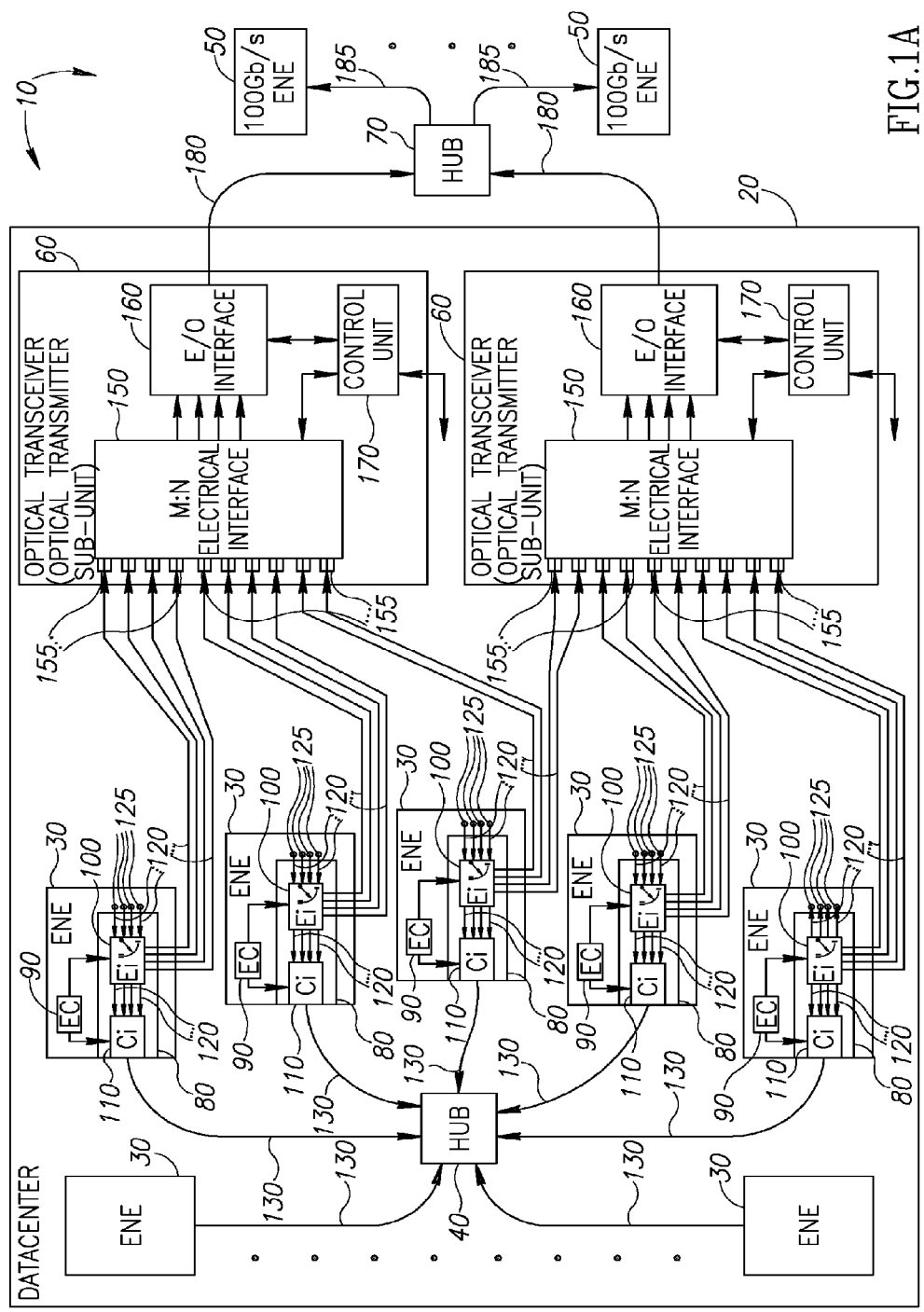
FIGS. 1A and 1B together constitute a simplified block diagram illustration of an implementation of a communication network which comprises and interconnects network elements (NEs) that operate at different bit rates, the communication network being constructed and operative in accordance with an embodiment of the present invention.
Figure 1B:
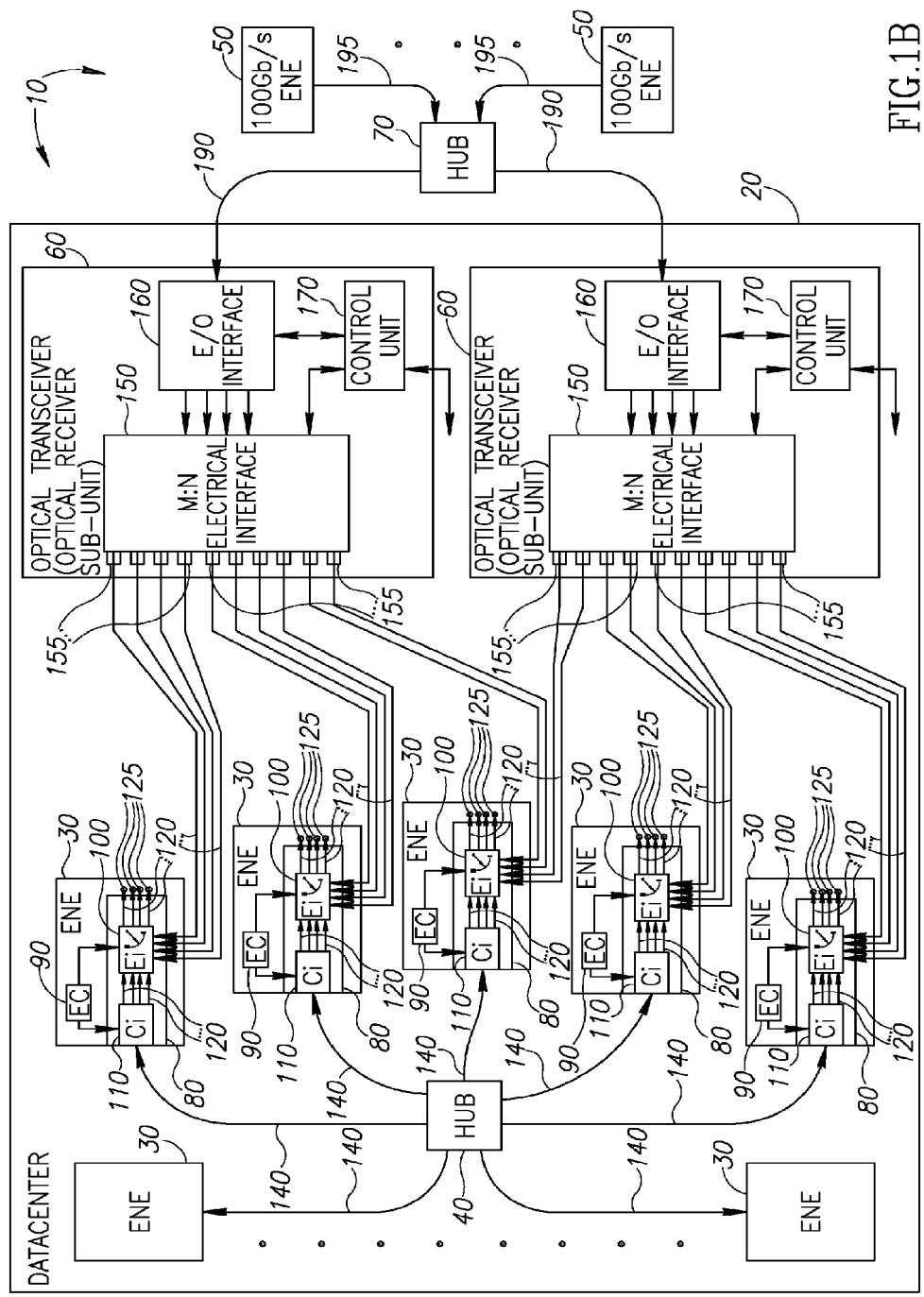

Reference is now made to FIGS. 1A and 1B, which together constitute a simplified block diagram illustration of an implementation of a communication network 10 which comprises and interconnects network elements (NEs) that operate at different bit rates, the communication network 10 being constructed and operative in accordance with an embodiment of the present invention.

By way of a non-limiting example, the network 10 in the embodiment of FIGS. 1A and 1B comprises an Ethernet network and the NEs comprise Ethernet NEs (ENEs). It is, however, appreciated that the network 10 may alternatively comprise a transport network, a transport network associated with an Ethernet network, a combination of an Ethernet network and a transport network, or any other appropriate network, in which case the NEs may comprise any appropriate respective NEs.

The network 10 and the NEs comprised therein may be used in any of the following network applications: a datacenter application; a local area network (LAN) application; a wide area network (WAN) application; a metropolitan area network (MAN) application; a storage area network (SAN) application; a cluster network application; an enterprise business data analysis application; a high performance computing (HPC) application; an intra-rack application; an inter-rack application; and an edge router application. For simplicity of depiction and description, and without limiting the generality of the foregoing, FIGS. 1A and 1B are depicted and described below in the context of a datacenter application, but it is appreciated that such depiction and description may also be applicable for any of the above-mentioned network applications.

In the datacenter application of FIGS. 1A and 1B, a datacenter 20 includes a plurality of NEs, at least some of the plurality of NEs comprising Ethernet NEs (ENEs) 30. By way of a non-limiting example, each ENE 30 comprises a server. The ENEs 30 operate at a bit rate $R_1$ and communicate with one another at the bit rate $R_1$ via at least one hub or concentration point 40.

The ENEs 30 also communicate with remote NEs. At least some of the remote NEs comprise ENEs 50 that operate at a bit rate $R_2$ which is greater than $R_1$. Each ENE 50 may, by way of a non-limiting example, comprise a router.

The ENEs 30 communicate with the ENEs 50 via transceivers 60 that operate at the bit rate $R_2$, and via at least one hub or concentration point 70. By way of a non-limiting example, in the embodiment of FIGS. 1A and 1B the ENEs 30 communicate with the ENEs 50 in the optical domain, that is, by using optical communication. In such a case, the transceivers 60 comprise optical transceivers which operate at the bit rate $R_2$, and the hub or concentration point 70 comprises an optical hub or concentration point which may, for example, comprise a passive optical hub enabling operation in a bus/broadcast configuration.

It is, however, appreciated that in a case where the ENEs 30 communicate with the ENEs 50 over short communication paths, such as over paths of up to 10 meters long, the ENEs 30 may alternatively communicate with the ENEs 50 in the electrical domain, in which case radio-frequency (RF) transceivers and an RF hub (all not shown) may replace the optical transceivers 60 and the optical hub 70, respectively.

The term "transceiver" is used throughout the present specification and claims to include a combination of a transmitter and a receiver. The term "optical transceiver" is used throughout the present specification and claims to include a combination of an optical transmitter and an optical receiver.

FIG. 1A depicts the network 10 in communication in a direction from the ENEs 30, that is, towards the hub 40 and/or towards the ENEs 50, and FIG. 1B depicts the network 10 in communication in a direction towards the ENEs 30, that is, from the hub 40 and/or from the ENEs 50.

A ratio of the bit rate $R_2$ to the bit rate $R_1$ is represented by a ratio M:N, M and N are positive integers, and M>N. For example, $R_2$ and $R_1$ may be as follows: $R_2=M \times J \times R_0$ ("x" is multiplication sign), and $R_1=N \times J \times R_0$, where J is a positive integer and $R_0$ is, for example, a lane bit rate.

By way of a non-limiting example, in the embodiment of FIGS. 1A and 1B the bit rate $R_1$ is a bit rate of substantially 40 Gb/s (Gb/s—gigabit per second), and therefore each ENE 30 transmits data to at least one other ENE 30 via the hub 40 at substantially 40 Gb/s and receives data from at least one other ENE 30 via the hub 40 at substantially 40 Gb/s. Further by way of a non-limiting example, in the embodiment of FIGS. 1A and 1B the bit rate $R_2$ is a bit rate of substantially 100 Gb/s, and therefore each ENE 50 transmits data to at least one other ENE 50 and/or towards the ENEs 30 via the hub 70 at substantially 100 Gb/s and receives data from at least one other ENE 50 and/or from the ENEs 30 via the hub 70 at substantially 100 Gb/s.

The bit rate of substantially 40 Gb/s represents an accumulated bit rate of 4 lanes, each operating at a lane bit rate $R_0$ of substantially 10 Gb/s, and the bit rate of substantially 100 Gb/s represents an accumulated bit rate of 10 lanes, each operating at the lane bit rate $R_0$. Therefore, in the embodiment of FIGS. 1A and 1B $R_1=4 \times R_0$, $R_2=10 \times R_0$, the ratio $R_2$ to $R_1$ is represented by the non-integer ratio 10:4=5:2, which means that M=5 and N=2, and J=2.

The term "substantially 10 Gb/s" is used throughout the present specification and claims to refer to a bit rate of 10 Gb/s or approximately 10 Gb/s, the term "substantially 40 Gb/s" is used throughout the present specification and claims to refer to a bit rate of 40 Gb/s or approximately 40 Gb/s, the term "substantially 100 Gb/s" is used throughout the present specification and claims to refer to a bit rate of 100 Gb/s or approximately 100 Gb/s, and so forth. For example, the bit rate of substantially 10 Gb/s may be 10.3125 Gb/s which is greater than 10 Gb/s, the bit rate of substantially 40 Gb/s may be 4×10.3125 Gb/s, which means that the bit rate of substantially 40 Gb/s is greater than 40 Gb/s, and the bit rate of substantially 100 Gb/s may be 10×10.3125 Gb/s, which means that the bit rate of substantially 100 Gb/s is greater than 100 Gb/s.

Each ENE 30 includes a transceiver 80 and an element controller (EC) 90. Each transceiver 80 includes an electrical interface (EI) 100 and a communication interface (CI) 110. The electrical interface 100 and the communication interface 110 may, by way of a non-limiting example, be comprised in one or more integrated circuits (ICs).

The electrical interface 100 is operatively associated with electrical lanes 120, each operating at the lane bit rate $R_0$ of substantially 10 Gb/s. The electrical lanes 120 comprise separate lanes for transmission of data and for reception of data. Since $R_1=4 \times R_0$, the electrical interface 100 is associated with 4 electrical lanes 120 for transmission of data as shown in FIG. 1A, and with 4 electrical lanes 120 for reception of data as shown in FIG. 1B.

The electrical lanes 120 in each ENE 30 may originate from or terminate at interconnections within the ENE 30 and/or elements or interconnections associated with the ENE 30. For example, the electrical lanes 120 may originate from or terminate at an external element associated with the ENE 30, where the external element may be a storage device, a controller, or a service supplier source. For simplicity of depiction and description, and without limiting the generality of the foregoing, origins and terminations of the electrical lanes 120 in each ENE 30 are generally denoted by reference numeral 125. At least one of the electrical lanes 120 comprises one of the following lane types: an electrical lane of an intra-rack interconnection; an electrical lane of an inter-rack interconnection; an electrical lane of an HPC interconnection; an electrical lane of a server interconnection; an electrical lane of a LAN interconnection; an electrical lane of a MAN interconnection; an electrical lane of a WAN interconnection; an electrical lane of a SAN interconnection; and an electrical lane of a cluster network interconnection. The electrical lanes 120 in each ENE 30 may either comprise electrical lanes of the same lane type, or comprise a combination of at least two of the lane types mentioned above.

The EC 90 is operatively associated with the electrical interface 100 and with the communication interface 110.

By way of a non-limiting example, the ENEs 30 in the embodiment of FIGS. 1A and 1B communicate with one another in the optical domain, that is, by using optical communication and the hub 40 comprises an optical hub or concentration point which may, for example, comprise a passive optical hub enabling operation in a bus/broadcast configuration. In such a case, the communication interface 110 comprises an electro-optic (E/O) communication interface communicating in the optical domain at the bit rate $R_1$. It is, however, appreciated that the ENEs 30 may alternatively communicate with one another in the electrical domain, in which case the communication interface 110 comprises an RF communication interface (not shown) communicating in the electrical domain at the bit rate $R_1$.

The E/O communication interface 110 includes, for example, a transmission sub-unit (not shown) which comprises a combination of laser drivers (LDs) and lasers, such as vertical cavity surface-emitting lasers (VCSELs) (all not shown). When the E/O communication interface 110 receives, via the electrical interface 100, data to be transmitted towards the hub 40, the E/O communication interface 110 employs the combination of LDs and lasers to convert the data to be transmitted into optical signals at substantially 40 Gb/s, and to transmit the optical signals at substantially 40 Gb/s to the hub 40.

By way of a non-limiting example, in the embodiment of FIG. 1A the optical signals at substantially 40 Gb/s are transmitted in a multiplexed form over a fiber optic cable 130. In such a case, the E/O communication interface 110 may also include a wavelength division multiplexing (WDM) multiplexer (MUX) (not shown), and the WDM MUX multiplexes optical signals outputted from the lasers to form the optical signals at substantially 40 Gb/s. The optical signals at substantially 40 Gb/s are then transmitted over the fiber optic cable 130 towards the hub 40.

Alternatively, the optical signals outputted from the lasers may be transmitted in a non-multiplexed form, in which case the optical signals outputted from the lasers may be transmitted towards the hub 40 over a fiber ribbon cable (not shown) in which each fiber optic cable is associated with one of the lasers.

The E/O communication interface 110 further includes, for example, a receiving sub-unit (not shown) which comprises a combination of PIN (p-intrinsic-n) photodiodes and amplifiers (all not shown). When the E/O communication interface 110 receives optical signals at substantially 40 Gb/s from the hub 40, the E/O communication interface 110 employs the PIN photodiodes to receive the optical signals at substantially 40 Gb/s and to convert the received optical signals into lane-separated electrical signals at substantially 10 Gb/s lane rates (that is, 4×10 Gb/s), and employs the amplifiers to amplify the lane-separated electrical signals.

By way of a non-limiting example, in the embodiment of FIG. 1B the received optical signals comprise multiplexed optical signals and the multiplexed optical signals are received over a fiber optic cable 140. In such a case, the E/O communication interface 110 may also include a WDM demultiplexer (deMUX) (not shown) which demultiplexes the multiplexed optical signals prior to reception by the PIN photodiodes.

Alternatively, if the received optical signals comprise non-multiplexed optical signals, the received non-multiplexed optical signals may, for example, be received over a fiber ribbon cable (not shown) in which each fiber optic cable is associated with one of the PIN photodiodes.

In a case where the ENEs 30 communicate with one another in the electrical domain and the communication interface 110 comprises an RF communication interface, the RF communication interface accumulates electrical signals provided over the electrical lanes 120 to form substantially 40 Gb/s electrical signals or converts the electrical signals provided over the electrical lanes 120 into substantially 40 Gb/s electrical signals, transmits the substantially 40 Gb/s electrical signals, and converts received electrical signals at substantially 40 Gb/s into lane-separated electrical signals at substantially 10 Gb/s lane rates.

The RF communication interface may include, for example, an RF transmitting unit (not shown) which multiplexes and modulates electrical signals provided thereto as is well known in the art, and an RF receiving unit (not shown) which demodulates and demultiplexes electrical signals received thereat as is well known in the art.

The EC 90 is operative to control the electrical interface 100 for effecting communication with another ENE 30 via the communication interface 110 by interconnecting the electrical lanes 120 with the communication interface 110, and for effecting communication with an ENE 50 by bypassing the communication interface 110 and interconnecting the electrical lanes 120 with an M:N electrical interface 150 of one optical transceiver 60 or with a plurality of M:N electrical interfaces 150 of a plurality of the optical transceivers 60. Each M:N electrical interface 150 is associated with or comprises lane ports 155, and the electrical lanes 120 are interconnected with the M:N electrical interface 150 or with the plurality of M:N electrical interfaces 150 via the lane ports 155.

It is appreciated that the EC 90 may be operative under control of a network operator (not shown), and the bypassing may be performed in response to at least one of the following: an instruction of the network operator; and a selection by the network operator.

In addition to an M:N electrical interface 150 and its lane ports 155, each optical transceiver 60 also comprises an E/O interface 160 and a control unit 170 which are operatively associated with the M:N electrical interface 150. The control unit 170 may comprise a micro-controller (not shown) which identifies and reports faults, such as thermal deviation faults, and performs other transceiver control operations.

Each M:N electrical interface 150 enables translation between bit rates whose ratio is represented by the ratio M:N. Since in the embodiment of FIGS. 1A and 1B M=5 and N=2, each M:N electrical interface 150 in the embodiment of FIGS. 1A and 1B is a 5:2 electrical interface enabling translation between bit rates whose ratio is represented by the ratio 5:2.

FIG. 1A depicts only those parts of the 5:2 electrical interfaces 150 and of the E/O interfaces 160 which are comprised in the optical transmitter sub-units of the optical transceivers 60. Each such part of a 5:2 electrical interface 150 in one optical transmitter sub-unit of one optical transceiver 60 comprises 10 of the lane ports 155 for association with 10 electrical lanes 120 which are used for transmission to at least one of the ENEs 50 via the hub 70. FIG. 1B depicts only those parts of the 5:2 electrical interfaces 150 and of the E/O interfaces 160 which are comprised in the optical receiver sub-units of the optical transceivers 60. Each such part of a 5:2 electrical interface 150 in one optical receiver sub-unit of one optical transceiver 60 comprises 10 of the lane ports 155 for association with 10 electrical lanes 120 which are used for reception from at least one of the ENEs 50 via the hub 70.

By way of a non-limiting example, 5 ENEs 30 are associated with 2 optical transceivers 60 in the embodiment of FIGS. 1A and 1B. In FIG. 1A, each optical transceiver 60 is associated with 10 electrical lanes 120 which are used for transmission to at least one of the ENEs 50 and branch off the electrical interfaces 100 of 3 of the 5 ENEs 30. In FIG. 1B each optical transceiver 60 is associated with 10 electrical lanes 120 which are used for reception from at least one of the ENEs 50 and couple to the electrical interfaces 100 of the 3 ENEs 30.

In a case where the datacenter 20 includes more than 5 ENEs 30, the datacenter 20 may utilize more than 2 optical transceivers 60. Basically, a number N×K of optical transceivers 60 is utilized with a number M×K of the ENEs 30, where K is a positive integer. In such a case, in order to enable communication between the ENEs 30 and the ENEs 50, the ECs 90 of the M×K ENEs 30 control the respective electrical interfaces 100 of the M×K ENEs 30 so as to bypass the respective communication interfaces 110 of the M×K ENEs 30 by interconnecting is the electrical lanes 120 of the M×K ENEs 30 with the M:N electrical interfaces 150 of the N×K optical transceivers 60, and at least one of the N×K optical transceivers 60 is used for communicating data between at least one of the M×K ENEs 30 interconnected with the at least one of the N×K optical transceivers 60 and at least one of the ENEs 50. It is appreciated that the communication interfaces 110 of the M×K ENEs 30 may be bypassed in response to at least one of the following: an instruction of the network operator; and a selection by the network operator.

Since in FIGS. 1A and 1B five ENEs 30 are associated with two optical transceivers 60, FIGS. 1A and 1B refer to a case where K=1. In FIGS. 1A and 1B there are additional ENEs 30 which are illustrated without depiction of any internal units. Such additional ENEs 30 are intended to show that the datacenter 20 may include more than 5 ENEs 30. The additional ENEs 30 may be associated with additional optical transceivers 60 (not shown).

Since in the embodiment of FIGS. 1A and 1B each 5:2 electrical interface 150 is associated with 10 electrical lanes 120 which are used for transmission to at least one of the ENEs 50 and with 10 electrical lanes 120 which are used for reception from at least one of the ENEs 50, each 5:2 electrical interface 150 translates 10×10 Gb/s to 4×25 Gb/s and vice versa, that is, converts 10 lanes at substantially 10 Gb/s lane rates (10×10 Gb/s) into 4 lanes at substantially 25 Gb/s lane rates (4×25 Gb/s) for transmission to at least one of the ENEs 50, and converts 4 lanes at substantially 25 Gb/s lane rates (4×25 Gb/s) into 10 lanes at substantially 10 Gb/s lane rates (10×10 Gb/s) on reception from at least one of the ENEs 50.

At least one of the 5:2 electrical interfaces 150 may comprise at least one 5:2 serializer/de-serializer (SerDes) IC (not shown). In the embodiment of FIGS. 1A and 1B, each 5:2 electrical interface 150 comprises two 5:2 SerDes ICs (not shown), each comprising one 5:2 serializer IC and one 2:5 de-serializer IC. Each of the 5:2 SerDes ICs may be a SerDes IC as described in the above-mentioned article of Cole et al. It is appreciated that the 5:2 electrical interface 150 may alternatively comprise a single SerDes IC (not shown) comprising two 5:2 serializer ICs and two 2:5 de-serializer ICs.

Each E/O interface 160 includes, for example, a combination of 4 modulator drivers (MDs) and 4 electro-absorption modulator lasers (EMLs) or a combination of 4 laser drivers (LDs) and 4 direct modulation lasers (DMLs), and a WDM MUX (all not shown). The combination of 4 MDs and 4 EMLs or the combination of 4 LDs and 4 DMLs receives 4×25 Gb/s electrical signals from the 5:2 electrical interface 150 associated with the E/O interface 160, converts the 4×25 Gb/s electrical signals into 4×25 Gb/s optical signals, and transmits the optical signals via the WDM MUX which multiplexes the 4×25 Gb/s optical signals into optical signals at substantially 100 Gb/s. The optical signals at substantially 100 Gb/s are transmitted to the hub 70 over a fiber optic cable 180. The hub 70 broadcasts the optical signals at substantially 100 Gb/s to the ENEs 50 over fiber optic cables 185.

Each E/O interface 160 also includes, for example, a combination of 4 PIN photodiodes and 4 amplifiers and a WDM deMUX (all not shown). The WDM deMUX is operatively associated with the hub 70 via a fiber optic cable 190, and the hub 70 is operatively associated with each ENE 50 via a fiber optic cable 195. The WDM deMUX receives optical signals at substantially 100 Gb/s which are transmitted by an ENE 50 over the fiber optic cable 195 to the hub 70, and from the hub 70 over the fiber optic cable 190. The WDM deMUX demultiplexes the received optical signals into 4×25 Gb/s optical signals, and provides the 4×25 Gb/s optical signals to the 4 PIN photodiodes. The 4 PIN photodiodes convert the 4×25 Gb/s optical signals into 4×25 Gb/s electrical signals, and provide the 4×25 Gb/s electrical signals to the 4 amplifiers which amplify the 4×25 Gb/s electrical signals and provide amplified 4×25 Gb/s electrical signals to the associated 5:2 electrical interface 150.

In operation, the ENEs 30 may, for example, operate as a cluster of servers 30 in which the servers 30 communicate with one another and with external clients (not shown) over links operating at substantially 40 Gb/s, and with the ENEs 50 over links operating at substantially 100 Gb/s. In such a case, a server 30 may, for example, process data and/or obtain data from one or more origins 125, and provide the data to its electrical interface 100 over its electrical lanes 120. Each electrical lane 120 operates at a substantially 10 Gb/s lane rate, and the accumulated bit rate at the electrical interface 100 is a bit rate of substantially 40 Gb/s.

If the data provided to the electrical interface 100 is intended for another server 30 or for an external client associated with the cluster, the EC 90 causes the electrical interface 100 to interconnect the electrical lanes 120 with the communication interface 110 for enabling the server 30 to transmit the data at a bit rate of substantially 40 Gb/s towards the hub 40. The hub 40 typically broadcasts the data to all of the servers 30 and external clients associated therewith, but only an addressed server 30 or external client, that is, a server 30 or external client whose destination address is comprised in a destination address field of a packet comprised in or associated with the data, uses the data. It is appreciated that since the data is transmitted at a bit rate of substantially 40 Gb/s which represents an accumulated bit rate of 4 lanes, each operating at a lane bit rate of substantially 10 Gb/s, the packet may be comprised in or associated with the data on a lane-by-lane basis, that is, a copy of the packet is added to or associated with each of the 4 lanes.

Since the hub 40 broadcasts the data, the transmitting server 30 also receives a copy of the data over a fiber optic cable 140 associated with the receiving sub-unit of the transmitting server 30. The transmitting server 30 may then, for example, use the copy of the data to verify that the data was properly transmitted.

If the data provided to the electrical interface 100 is intended for an ENE 50, the EC 90 causes the electrical interface 100 to bypass the communication interface 110 and to interconnect the electrical lanes 120 with the 5:2 electrical interface 150 of one of the optical transceivers 60, or with 5:2 electrical interfaces 150 of more than one optical transceiver 60, for enabling the server 30 to transmit the data towards the hub 70. The hub 70 typically broadcasts the data to all of the ENEs 50, but only an addressed ENE 50, that is, an ENE 50 whose destination address is comprised in a destination address field of a packet comprised in or associated with the data, uses the data.

It is appreciated that since the hub 70 broadcasts the data, all the optical transceivers 60 which are associated with the hub 70 also receive a copy of the data at their optical receiver sub-units, and distribute copies of the data to the servers 30 via the electrical lanes 120 which are used for reception from the ENEs 50. Since the servers 30 are not addressed, they do not use the copy of the data, but the transmitting server 30 may, for example, use the copy of the data to verify that the data was properly transmitted.

It is further appreciated that since data transmitted from a server 30 via at least one of the optical transceivers 60 and the hub 70 is also received by other servers 30, links provided via the optical transceivers 60 and the hub 70 and operating at substantially 100 Gb/s may also be used as backup and protection links for links provided via the hub 40 and operating at substantially 40 Gb/s. Thus, if, for example, the hub 40 becomes inoperable, the servers 30 may communicate with one another over the links operating at substantially 100 Gb/s instead of over the links operating at substantially 40 Gb/s.

In a case where an ENE 50 transmits data at substantially 100 Gb/s via the hub 70, the hub 70 broadcasts the data to all of the ENEs 50 and the optical transceivers 60 associated therewith, and the optical transceivers 60 provide a copy of the data to the servers 30 associated therewith via the optical receiver sub-units of the optical transceivers 60 and via the electrical lanes 120 which are used for reception from at least one of the ENEs 50. If the data comprises or is associated with a packet which has, in its destination address field, an address of another ENE 50, then only the addressed ENE 50 uses the data.

The data transmitted by the ENE 50 at substantially 100 Gb/s may alternatively be intended for some servers 30. In such a case, the data comprises or is associated with packets having, in their destination address fields, addresses of such servers 30. Since the data is transmitted at a bit rate of substantially 100 Gb/s which represents an accumulated bit rate of 10 lanes, each operating at a lane bit rate of substantially 10 Gb/s, the packets may be comprised in or associated with the data on a lane-by-lane basis, that is, copies of the packets are added to or associated with each of the 10 lanes. The optical transceivers 60 distribute the copy of the data to all of the servers 30 associated therewith, but only the addressed servers 30 use the copy of the data.

The embodiment of FIGS. 1A and 1B enables the ENEs 30 to communicate with the ENEs 50 by using the optical transceivers 60 for translating from $R_1$ to $R_2$ and from $R_2$ to $R_1$ and without requiring additional, special-purpose equipment (not shown) for such translations thus improving functionality and interconnectivity of the ENEs 30 and the ENEs 50, particularly in connection with enabling communication between the ENEs 30 and the ENEs 50. Such special-purpose equipment would have otherwise been required if the hub 40 would have to be adapted to communicate with the hub 70 and the hub 70 would have to be adapted to communicate with the hub 40, or if each ENE 30 and each ENE 50 would have to be individually adapted to communicate with one another. It is appreciated that such special-purpose equipment is typically complex and expensive, particularly, but not only, if is it necessary to implement such adaptations in the optical domain, and particularly, but not only, in cases where the ratio M:N is non-integer.

The embodiment of FIGS. 1A and 1B also improves functionality and interconnectivity of the ENEs 30 and the ENEs 50 by enabling links operating at substantially 100 Gb/s to be used as backup and protection links for links operating at substantially 40 Gb/s.

The lane bit rate $R_0$ may be viewed as a common bit rate factor because $R_1$ is obtained from a multiplication of $R_0$ by the positive integers N and J, $R_2$ is obtained from a multiplication of $R_0$ by the positive integers M and J, and each of the electrical lanes 120 operates at the lane bit rate $R_0$. The present invention, in certain embodiments thereof, uses this common bit rate factor to enable communication between an ENE 30 and an ENE 50 by employing one or more of the optical transceivers 60 without requiring the special-purpose equipment for translations between the bit rates $R_1$ and $R_2$.

It is thus noted that in the present invention an ENE 30 operating at the bit rate $R_1$ which represents an accumulated bit rate of N×J lanes, each operating at the lane bit rate $R_0$, is enabled to communicate with an ENE 50 operating at the bit rate $R_2$ which is greater than $R_1$ and represents an accumulated bit rate of M×J lanes, each operating at the lane bit rate $R_0$, by providing at least one transceiver 60 which operates at the bit rate $R_2$ and comprises M×J lane ports 155 for lanes operating at the lane bit rate $R_0$, interconnecting N×J lanes 120 of the ENE 30 with N×J of the M×J lane ports 155 of the at least one transceiver 60, and using the at least one transceiver 60 for communicating data between the ENE 30 and the ENE 50.

In the embodiment of FIGS. 1A and 1B, the electrical lanes 120 used for transmission to at least one of the ENEs 50 and the electrical lanes 120 used for reception from at least one of the ENEs 50 are interconnected with the 5:2 electrical interfaces 150 of the optical transceivers 60 in a pre-selected interconnection scheme. In the pre-selected interconnection scheme of FIGS. 1A and 1B, only one ENE 30 has its electrical lanes 120 which are used for transmission to at least one of the ENEs 50 split between two 5:2 electrical interfaces 150 and its electrical lanes 120 which are used for reception from at least one of the ENEs 50 split between the two 5:2 electrical interfaces 150. A similar interconnection scheme may be applied in a case where K>1.

It is, however, appreciated that the electrical lanes 120 of the ENEs 30 may alternatively be interconnected with the 5:2 electrical interfaces 150 in any other appropriate pre-selected interconnection scheme. For example, a distribution of the electrical lanes 120 of the M×K ENEs 30 may be determined, and each lane of the distribution may be interconnected with a respective lane port 155 of one of the 5:2 electrical interfaces 150. The distribution may, for example, define an interconnection scheme in which each ENE 30 has its electrical lanes 120 split between two 5:2 electrical interfaces 150 thus associating each optical transceiver 60 with electrical lanes 120 of 5 ENEs 30.

It is appreciated that the distribution may be determined, for example, in response to at least one of the following: an instruction of the network operator; and a selection by the network operator. The network operator may, for example, use a processor (not shown) for computing the distribution. After computing the distribution the network operator may, for example, interconnect the electrical lanes 120 with the 5:2 electrical interfaces 150 of the optical transceivers 60 according to the distribution, and use a transmitter (not shown) for transmitting an indication identifying the distribution to at least one of the following: at least one of the M×K ENEs 30; and at least one of the ENEs 50.

In accordance with another embodiment of the present invention which is described below with reference to FIGS. 2A and 2B, the electrical lanes 120 may be interconnected with the 5:2 electrical interfaces 150 of the optical transceivers 60 in a programmable and changeable scheme.

Figure 2A:
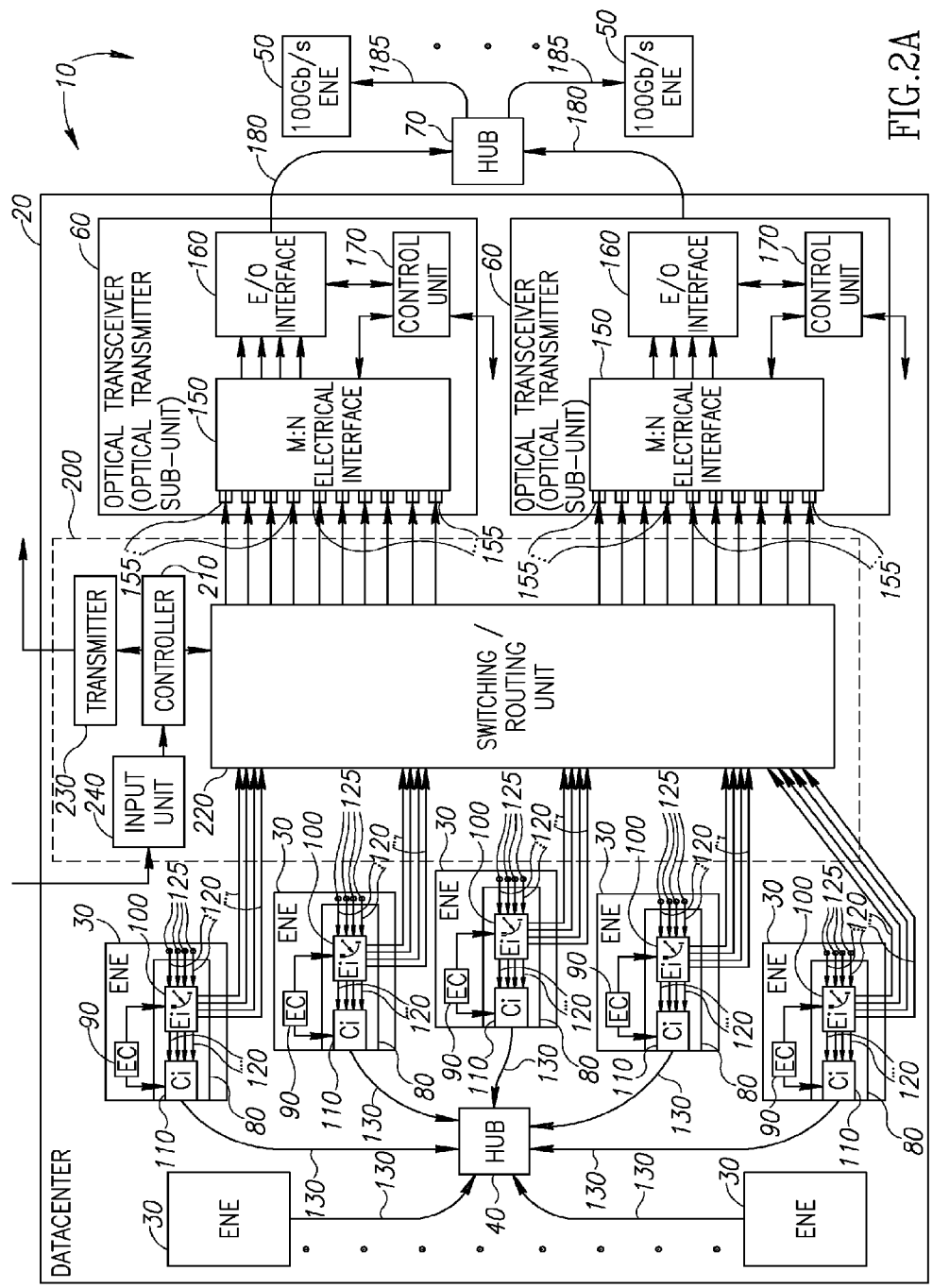
FIGS. 2A and 2B together constitute a simplified block diagram illustration of another implementation of the communication network of FIGS. 1A and 1B in accordance with another embodiment of the present invention.
Figure 2B:
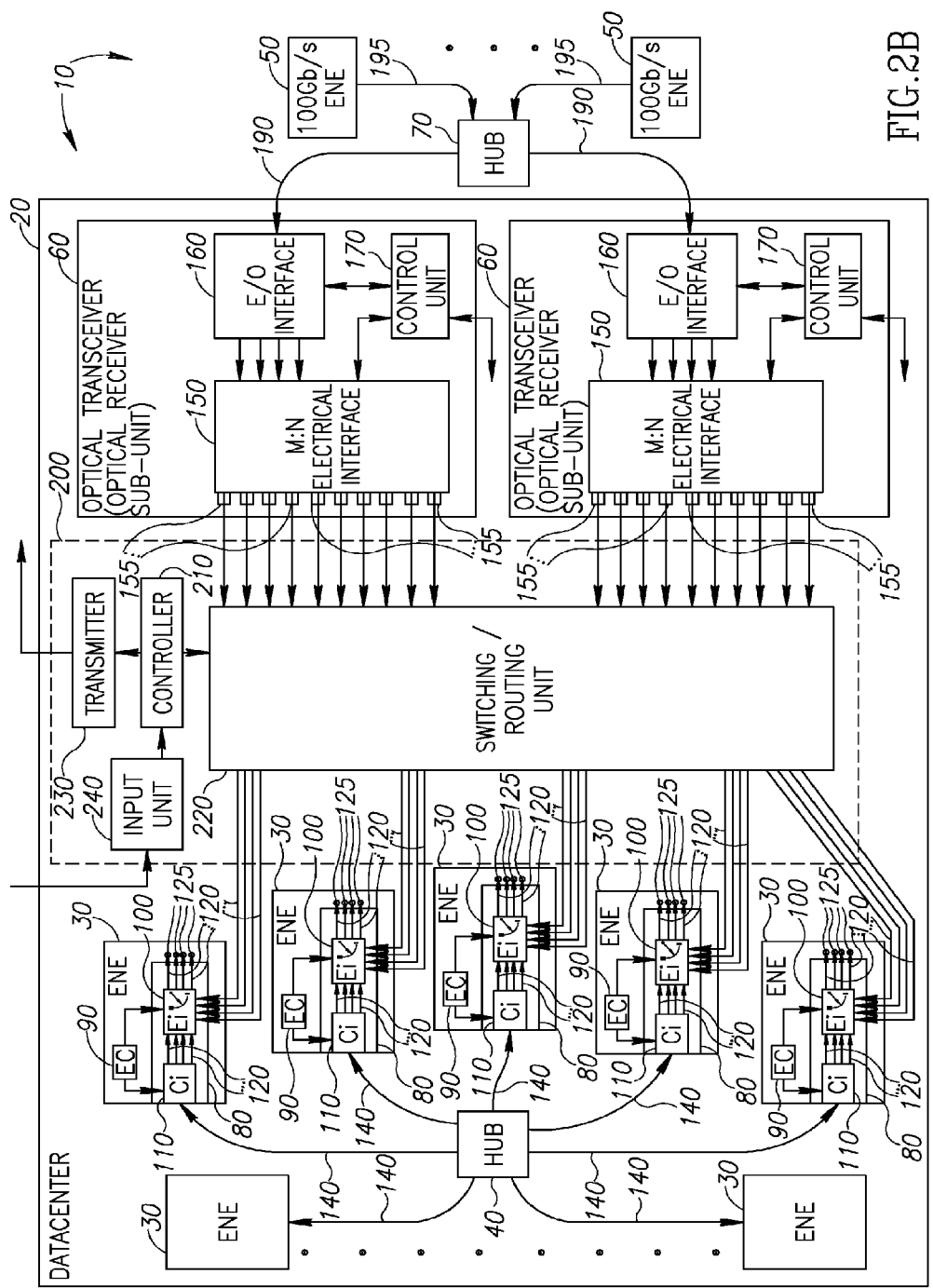

Reference is now additionally made to FIGS. 2A and 2B, which together constitute a simplified block diagram illustration of another implementation of the communication network 10.

FIG. 2A depicts the network 10 in communication in a direction from the ENEs 30, that is, towards the hub 40 and/or towards the ENEs 50, and FIG. 2B depicts the network 10 in communication in a direction towards the ENEs 30, that is, from the hub 40 and/or from the ENEs 50.

The embodiment of FIGS. 2A and 2B is similar to the embodiment of FIGS. 1A and 1B except that the network 10 in the embodiment of FIGS. 2A and 2B additionally includes an interconnection switch 200, and the electrical lanes 120 may be interconnected with the M:N electrical interfaces 150 in a programmable and changeable scheme via the interconnection switch 200.

The interconnection switch 200 is operatively associated with the ENEs 30 and with the optical transceivers 60 and it enables the ENEs 30 to communicate with the ENEs 50 via the optical transceivers 60. The interconnection switch 200 includes a controller 210 and a switching/routing unit 220. The interconnection switch 200 may also include a transmitter 230 and an input unit 240.

The switching/routing unit 220 is operatively controlled by the controller 210 to interconnect the electrical lanes 120 of the M×K ENEs 30 with the M:N electrical interfaces 150 of the N×K optical transceivers 60 so as to bypass the communication interfaces 110 of the M×K ENEs 30 and to enable use of at least one of the N×K optical transceivers 60 for communicating data between at least one of the M×K ENEs 30 interconnected with the at least one of the N×K optical transceivers 60 and at least one of the ENEs 50. FIG. 2A depicts a part of the switching/routing unit 220 which is associated with the electrical lanes 120 which are used for transmission to at least one of the ENEs 50, and FIG. 2B depicts a part is of the switching/routing unit 220 which is associated with the electrical lanes 120 which are used for reception from at least one of the ENEs 50.

The controller 210 may be operative to determine a distribution of the electrical lanes 120 of the M×K ENEs 30, and to control the switching/routing unit 220 for interconnecting each lane of the distribution with a respective lane port 155 of the M:N electrical interfaces 150. Additionally, the controller 210 may provide an indication identifying the distribution to the transmitter 230, and the transmitter 230 may transmit the indication identifying the distribution to at least one of the following: at least one of the M×K ENEs 30; and at least one of the ENEs 50. By way of a non-limiting example, the transmitter 230 may transmit the indication over a control channel (not shown).

It is appreciated that the distribution may be determined, for example, in response to at least one of the following: an instruction of the network operator; and a selection by the network operator. The network operator may, for example, employ the input unit 240 for inputting the instruction and/or selection usable by the controller 210 for determining the distribution.

By inputting different instructions and/or selections the network operator may change the distribution and thus interconnect the electrical lanes 120 with the M:N electrical interfaces 150 in a programmable and changeable scheme.

In operation, the network operator may change the distribution due to, for example, faults in one of the M×K ENEs 30 and/or in one of the optical transceivers 60. For example, if one of the M×K ENEs 30 and one of the optical transceivers 60 become inoperable, and the electrical lanes 120 of the inoperable ENE 30 are associated with an operable optical transceiver 60, the network operator may input an instruction or selection instructing the controller 210 to change the distribution and to cause the switching/routing unit 220 to disconnect the inoperable ENE 30 and to interconnect the electrical lanes 120 of another ENE 30 with the operable optical transceiver 60.

It is appreciated that the interconnection switch 200 may be a stand-alone unit comprised in the datacenter 20. Alternatively, the interconnection switch 200 may be comprised in one of the ENEs 30 or in one of the optical transceivers 60.

Reference is now made to FIG. 3, which is a simplified flowchart illustration of a method of enabling communication between NEs operating at different bit rates in any of the network of FIGS. 1A and 1B and the network of FIGS. 2A and 2B.

NEs operating at a bit rate $R_1$, and NEs operating at a bit rate $R_2$ are provided (step 300). Each NE operating at the bit rate $R_1$ comprises a communication interface which communicates at the bit rate $R_1$. A ratio of $R_2$ to $R_1$ is represented by a ratio M:N, M and N are positive integers, and M>N. The NEs operating at the bit rate $R_1$ comprise at least M×K NEs, where K is a positive integer.

A number N×K of transceivers operating at the bit rate $R_2$ is also provided (step 310). Each of the N×K transceivers comprises an M:N electrical interface which enables translation between bit rates whose ratio is represented by the ratio M:N.

In order to enable the NEs operating at the bit rate $R_1$ to communicate with the NEs operating at the bit rate $R_2$, communication interfaces of the M×K NEs operating at the bit rate $R_1$ are bypassed (step 320) by interconnecting electrical lanes of the M×K NEs with the M:N electrical interfaces of the N×K transceivers, and at least one of the N×K transceivers is used (step 330) for communicating data between at least one of the M×K NEs interconnected with the at least one of the N×K transceivers and at least one of the NEs operating at the bit rate $R_2$.

Figure 4:
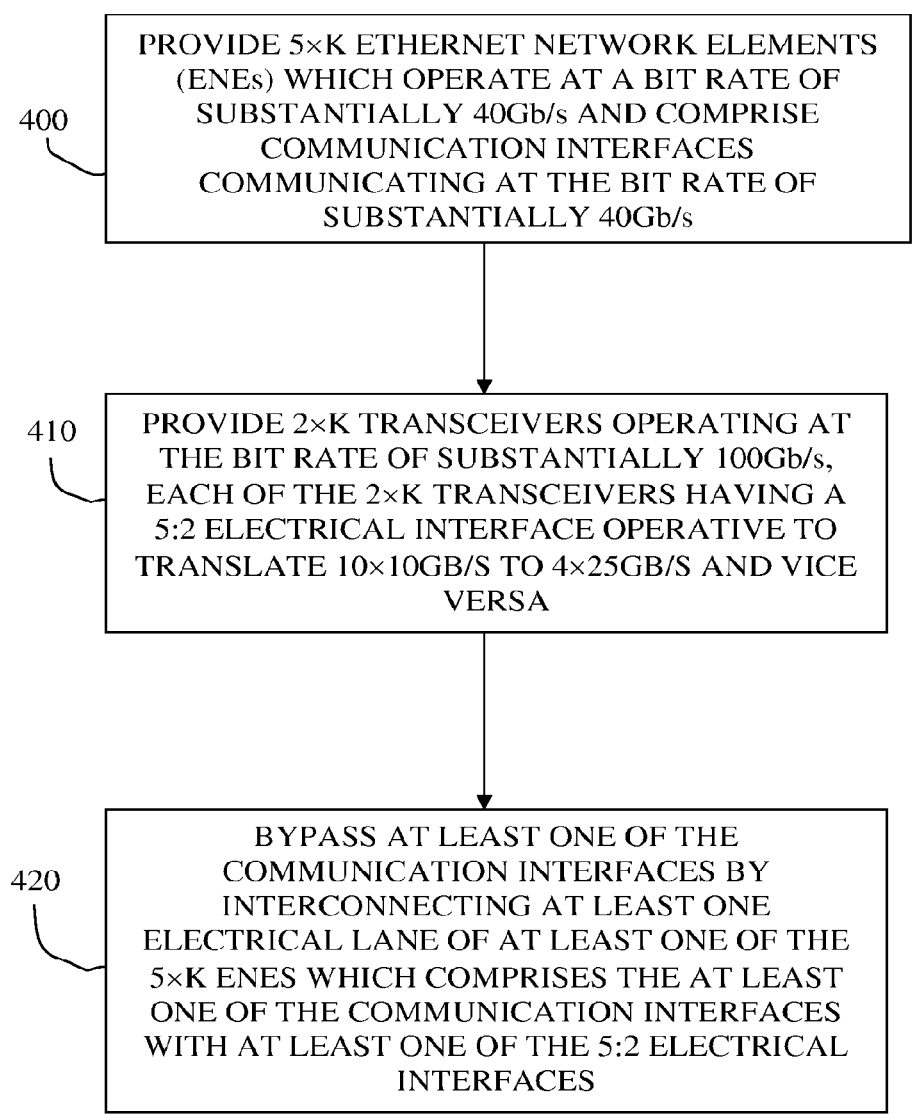
FIG. 4 is a simplified flowchart illustration of a method of interconnecting Ethernet network elements (ENEs) operating at a bit rate of substantially 40 Gb/s with transceivers operating at a bit rate of substantially 100 Gb/s in any of the network of FIGS. 1A and 1B and the network of FIGS. 2A and 2B.

Reference is now made to FIG. 4, which is a simplified flowchart illustration of a method of interconnecting Ethernet network elements (ENEs) operating at a bit rate of substantially 40 Gb/s with transceivers operating at a bit rate of substantially 100 Gb/s in any of the network of FIGS. 1A and 1B and the network of FIGS. 2A and 2B.

A number 5×K of ENEs which operate at a bit rate of substantially 40 Gb/s is provided (step 400), where K is a positive integer. Each of the 5×K ENEs comprises a communication interface communicating at the bit rate of substantially 40 Gb/s.

Additionally, a number 2×K of transceivers operating at the bit rate of substantially 100 Gb/s is also provided (step 410). Each of the 2×K transceivers has a 5:2 electrical interface operative to translate 10×10 Gb/s to 4×25 Gb/s and vice versa, that is, to convert 10 lanes at substantially 10 Gb/s lane rates (10×10 Gb/s) into 4 lanes at substantially 25 Gb/s lane rates (4×25 Gb/s), and to convert 4 lanes at substantially 25 Gb/s lane rates (4×25 Gb/s) into 10 lanes at substantially 10 Gb/s lane rates (10×10 Gb/s).

At least one of the communication interfaces is then bypassed (step 420) by interconnecting at least one electrical lane of at least one of the 5×K ENEs which comprises the at least one of the communication interfaces with at least one of the 5:2 electrical interfaces.

Figure 5:
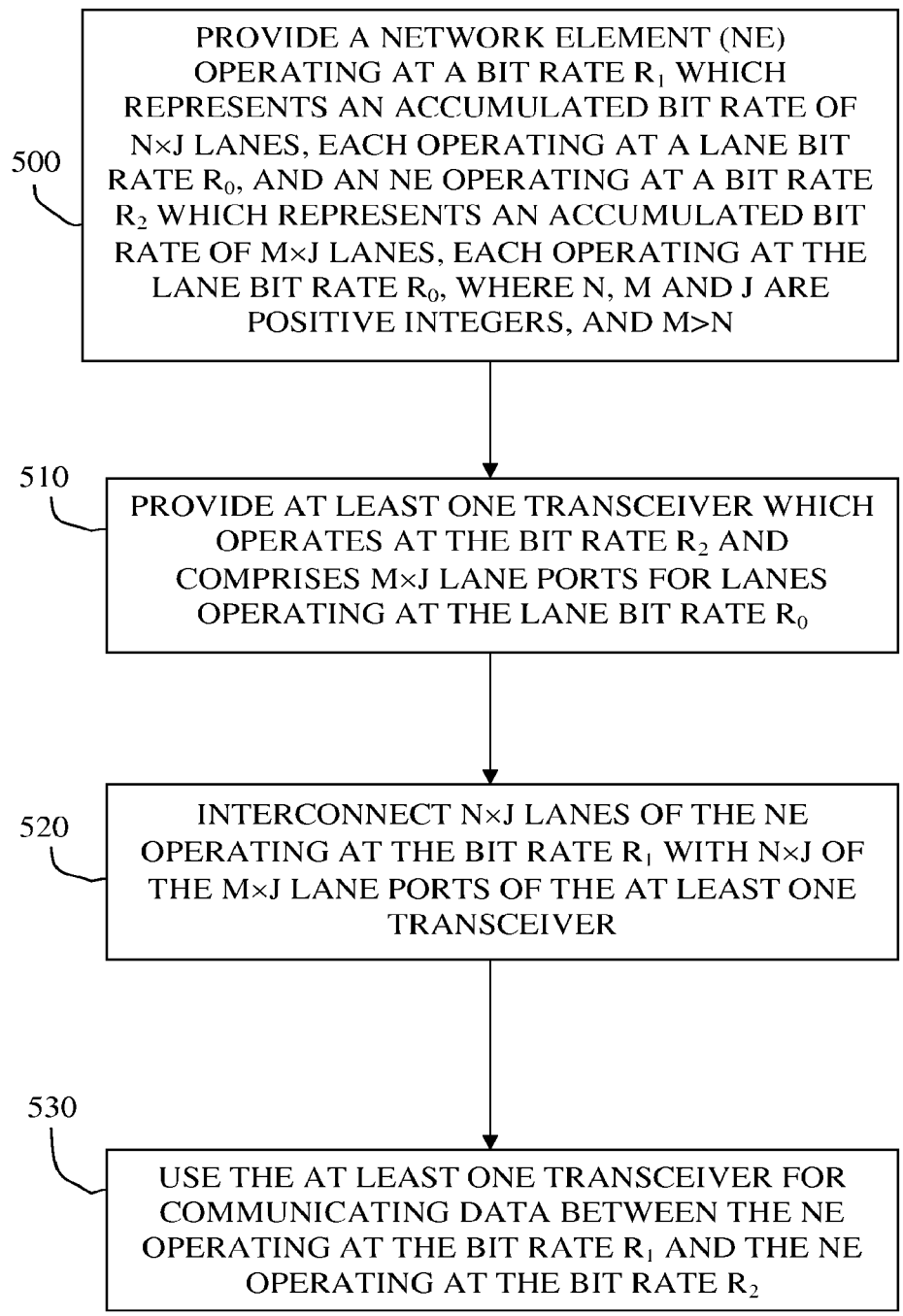
FIG. 5 is a simplified flowchart illustration of another method of enabling communication between NEs operating at different bit rates in any of the network of FIGS. 1A and 1B and the network of FIGS. 2A and 2B.

Reference is now made to FIG. 5, which is a simplified flowchart illustration of another method of enabling communication between NEs operating at different bit rates in any of the network of FIGS. 1A and 1B and the network of FIGS. 2A and 2B.

An NE operating at a bit rate $R_1$ which represents an accumulated bit rate of N×J lanes, each operating at a lane bit rate $R_0$, and an NE operating at a bit rate $R_2$ which represents an accumulated bit rate of M×J lanes, each operating at the lane bit rate $R_0$, are provided (step 500), where N, M, and J are positive integers, and M>N.

At least one transceiver which operates at the bit rate $R_2$ and comprises M×J lane ports for lanes operating at the lane bit rate $R_0$ is also provided (step 510).

Then, N×J lanes of the NE operating at the bit rate $R_1$ are interconnected (step 520) with N×J of the M×J lane ports of the at least one transceiver, and the at least one transceiver is used (step 530) for communicating data between the NE operating at the bit rate $R_1$ and the NE operating at the bit rate $R_2$.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and their equivalents:

What is claimed is:

1. A method for enabling communication between a network element (NE) operating at a bit rate $R_1$ and a NE operating at a bit rate $R_2$, wherein a ratio of $R_2$ to $R_1$ is represented by a ratio M:N, where M and N are positive integers and M>N, the method comprising:

receiving information, wherein the information is associated with distribution of electrical lanes of at least one of a number of M×K NEs operating at bit rate $R_1$, wherein each electrical lane operates at a lane bit rate $R_0$;

determining a distribution of the electrical lanes of the at least one M×K NE based on the received information;

interconnecting the electrical lanes of the at least one M×K NE with lane ports of at least one M:N electrical interface of N×K transceivers based on the determined distribution, wherein the at least one M:N electrical interface operates at a bit rate $R_2$, and wherein each lane port of the at least one M:N electrical interface operates at a lane bit rate $R_0$; and transmitting an indication identifying the distribution to the at least one M×K NE.

* * * * *